(12) United States Patent
Cao et al.

(10) Patent No.: US 9,708,203 B2
(45) Date of Patent: Jul. 18, 2017

(54) METHOD AND REACTOR FOR REMOVING ORGANIC MATTERS BY IMMOBILIZED-ENZYMATIC ELECTRODE COUPLED ELECTRO-COAGULATION

(75) Inventors: Hongbin Cao, Beijing (CN); He Zhao, Beijing (CN); Yuping Li, Beijing (CN); Haitao Li, Beijing (CN); Yi Zhang, Beijing (CN)

(73) Assignee: Institute of Process Engineering, Chinese Academy, Beijing (CN)

( * ) Notice: Subject to any disclaimer, the term of this patent is extended or adjusted under 35 U.S.C. 154(b) by 442 days.

(21) Appl. No.: 14/395,653

(22) PCT Filed: Jun. 20, 2012

(86) PCT No.: PCT/CN2012/077218
§ 371 (c)(1),
(2), (4) Date: Apr. 2, 2015

(87) PCT Pub. No.: WO2013/177835
PCT Pub. Date: Dec. 5, 2013

(65) Prior Publication Data
US 2015/0203374 A1 Jul. 23, 2015

(30) Foreign Application Priority Data
May 29, 2012 (CN) .......................... 2012 1 0169961

(51) Int. Cl.
*C02F 1/46* (2006.01)
*C02F 1/463* (2006.01)
(Continued)

(52) U.S. Cl.
CPC .......... *C02F 1/463* (2013.01); *C02F 1/46109* (2013.01); *C02F 3/005* (2013.01);
(Continued)

(58) Field of Classification Search
CPC ...... C02F 1/463; C02F 1/46109; C02F 3/005; C02F 2001/46142; C02F 3/342;
(Continued)

(56) References Cited

U.S. PATENT DOCUMENTS

| | | |
|---|---|---|
| 2003/0226766 A1 | 12/2003 | Orlebeke |
| 2015/0064501 A1* | 3/2015 | Ren .......................... H01M 8/16 429/2 |

FOREIGN PATENT DOCUMENTS

| | | |
|---|---|---|
| CN | 2866491 Y | 2/2007 |
| CN | 1982228 A | 6/2007 |
| CN | 101538097 A | 9/2009 |

* cited by examiner

*Primary Examiner* — Arun S Phasge
(74) *Attorney, Agent, or Firm* — Cesari and McKenna, LLP

(57) ABSTRACT

The present invention provides a method and a reactor for removing organic matters by immobilized-enzymatic electrode coupled electro-coagulation. In the method, in a single electrochemical system, an enzyme-modified electrode is combined with electro-coagulation to synergistically remove organic matters from water. Certain electrochemical parameters are controlled such that a polymerization reaction is performed between hydrogen peroxide generated by a cathode reaction and organic matters catalyzed by the immobilized-enzymatic electrode. After the polymerization reaction, the organic product enters an anode chamber through a pump. The organic product is precipitated and removed by performing a reaction between the organic product and different hydrolysis products from the electro-coagulation through a coagulating/flocculating effect of compression of a double electric layer, adsorption and electric neutralization as well as precipitation capture. Ultimately, the object of removing the organic matters synergistically through the enzymatic catalyzed polymerization at (Continued)

the cathode and the electro-coagulation at the anode is achieved. The present invention has a strong selectivity for low-concentration toxic organic pollutants and a good effect in removing small-molecular hydrophilic organic matters, the addition amount of enzyme is low, the cathode and the anode are fully used, the cost is reduced, the operation is simple, and the applicable is wide, therefore, the present invention is applicable to a variety of water and wastewater containing organic matters, and the contaminated water.

12 Claims, 1 Drawing Sheet

(51) Int. Cl.
*C02F 3/00* (2006.01)
*C02F 3/34* (2006.01)
*C02F 1/461* (2006.01)

(52) U.S. Cl.
CPC .... *C02F 3/342* (2013.01); *C02F 2001/46133* (2013.01); *C02F 2001/46138* (2013.01); *C02F 2001/46142* (2013.01); *C02F 2201/46115* (2013.01)

(58) Field of Classification Search
CPC .. C02F 2001/46138; C02F 2201/46115; C02F 2001/46133
See application file for complete search history.

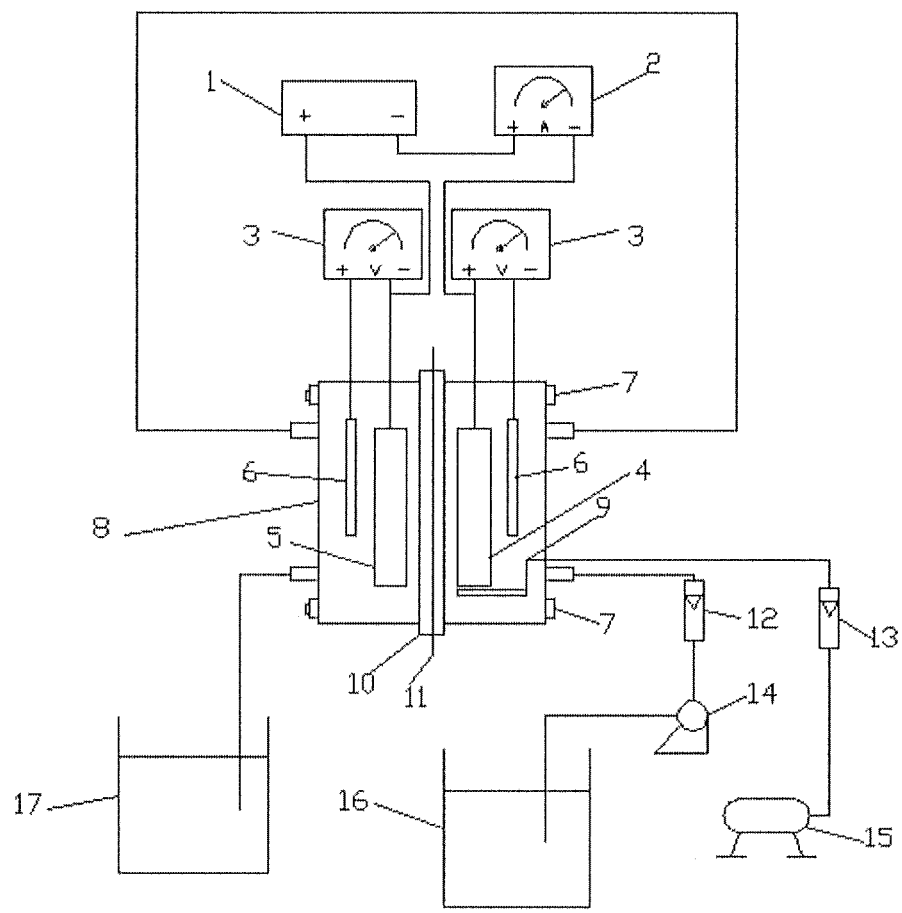

METHOD AND REACTOR FOR REMOVING ORGANIC MATTERS BY IMMOBILIZED-ENZYMATIC ELECTRODE COUPLED ELECTRO-COAGULATION

CROSS REFERENCE TO RELATED APPLICATIONS

This application is the National Stage of International Application No. PCT/CN2012/077218, filed on Jun. 20, 2012, which claims the benefit of Chinese Application No. 201210169961.6, filed on May 29, 2012. The contents of both applications are hereby incorporated by reference in their entirety.

BACKGROUND OF THE INVENTION

Field of the Invention

The present invention relate to a method for removing aquatic organic matters from water, and particularly, to a method and a reactor for removing aquatic organic matters synergistically by combining an immobilized peroxidase on electrode with electro-coagulation in a single electrochemical system.

Background Information

With the rapid industrialization in China, effluents discharged from industrial wastewater still contain a great quantity and variety of dissolved organic matters at a low concentration and with complicated constitution. For example, some effluents discharged directly after biochemical treatment still contain organic matters at a low concentration, e.g., polyphenols, polycyclic aromatic hydrocarbons, heterocyclic compounds, large molecular humic substances, etc. As a result, organic pollutants with low concentrations in water are increasingly serious in recent years and become an important hidden danger in water safety.

Enzymatic catalysis technology is a new-developed water treatment technology. On one hand, the enzymatic catalysis process has the advantages of a high catalytic activity, a rapid reaction rate, a high selectivity for the pollutants at a lower concentration, mild reaction conditions, simple and convenient treatment process, etc. On the other hand, a prominent merit of the electrochemical method is that the reaction speed can be controlled easily by the voltage and current without involving any additives and thus it owns a clean process. Accordingly, direct immobilization of enzyme molecules onto the surface of the electrode for direct electrochemical reaction has been got a great attention in water and wastewater treatments. Studies show that, when a peroxidase is immobilized on the surface of a cathode, the enzyme molecule still has high catalytic activity for polymerization on phenolic and aniline pollutants and accordingly form insoluble polymerization products for further precipitation and removal. However, this electro-enzymatic catalysis technology encounters the following limitations in practice: (1) addition amount of enzyme is high and thus the cost is increased; (2) precipitation and removal of the catalytic polymerization products are insufficient; (3) the anode is underutilized and thus leads to waste of energy; and (4) there is a limited effect on the removal of organic matters.

It is proved that the electro-coagulation technology has a greater advantage on improving the efficiency of water and wastewater treatments than the conventional coagulation process, and thus, it is widely used in the field of water and wastewater treatments. The electro-coagulation process has not only a good effect on removing effectively suspended substances in water and accordingly reducing the turbidity and chromaticity but also a better removal effect on organic matters, heavy metals and microbes in water, especially suitable for a small-scale water treatment. Generally, the basic principle of the electro-coagulation where an aluminum plate acts as the anode is that: placing an aluminum electrode in a raw water to be treated and applying a direct current to it such that the anode performs an electrochemical reaction and dissolves aluminum ions, after being performed hydrolysis, polymerization and complexing reactions under certain conditions, the aluminum ions then form a series of in situ polymerized aluminum hydrolyzed products and aluminum hydroxide precipitations with different charge quantities on the surfaces thereof. The electro-coagulation technology and the chemical coagulation technology are basically of the same nature, that is, they both function to remove the colloids and the suspended substances from water through coagulation/flocculation. However, the fresh polymerized aluminum hydrolyzed products generated in-situ during the electro-coagulation process has a relatively high reaction activity, which reduces the required amount of aluminum to a great extent and thus the consumption amount of aluminum in the electro-coagulation is about one third of that in the chemical coagulation method. However, the electro-coagulation technology also has the following disadvantages: (1) bad selectivity for the low-concentration pollutants; (2) poor effect in removing small-molecular hydrophilic organic matters; and (3) underutilization of the cathode which results in waste of energy.

SUMMARY OF THE INVENTION

An object of the present invention is to provide a method for removing organic matters by immobilized-enzymatic electrode coupled electro-coagulation. In a single electrochemical system, an immobilized peroxidase on electrode is combined with electro-coagulation so as to have a strong selectivity for low-concentration pollutants and a good effect on removing hydrophilic organic matters with small molecular weight and to avoid underutilization of the cathode and waste of energy. It is applicable not only to remove aquatic organic matters with low concentrations deeply from water or wastewater but also to remedy organic pollutants contaminated water.

According to an aspect of the present invention, there is provided a method for removing organic matters by immobilized-enzymatic electrode coupled electro-coagulation, comprising the steps of:

1) Coupling electro-coagulation, and an immobilized-enzymatic electrode in a single electrochemical system in which the cathode is an oxygenating electrode with an immobilized enzyme and the anode is an electro-coagulation sacrificial electrode;

2) separating the cathode and the anode in an electrolytic tank by a hydrogen ion exchange membrane to form a cathode chamber and an anode chamber;

3) introducing a raw water into the cathode chamber; subjecting the organic matters in the raw water to an enzyme catalytic polymerization reaction under the function of the immobilized-enzymatic electrode, under a certain cathode potential or a certain current density with a saturated calomel electrode as a reference electrode; and pumping the reacted raw water into the anode chamber after a certain residence time; and 4) generating fresh hydrolysis products by dissolving the metal anode in the anode chamber, under a certain anode potential or a certain current density with a saturated calomel electrode as a reference electrode; precipitating and removing the organic polymerized products, which are produced from an enzymatic catalysis reaction in the cathode chamber, by metal hydrolysis products through a coagulation/flocculation effect of compression of a double electric layer, adsorption and electric neutralization as well as precipitation capture or the like; and discharging the treated water from the anode chamber after an electro-coagulation reaction so as to achieve the object of removing the organic matters synergistically through the enzymatic catalyzed polymerization at the cathode and the electro-coagulation at the anode.

The principle of the present invention is as follows: coupling electro-coagulation and an immobilized enzyme on electrode in a single electrochemical system in which the cathode is an immobilized-enzymatic electrode and the anode is an electro-coagulation sacrificial electrode; separating the cathode and the anode in an electrolytic tank by a hydrogen ion exchange membrane to form a cathode chamber and an anode chamber; introducing a raw water into the cathode chamber; under certain electrochemical parameters; performing an enzymatic catalyzed polymerization reaction of the organic matters in the raw water; the product after the reaction enters the anode chamber through a water pump, and then exits from the anode after electro-coagulation. Primary functions of the hydrogen ion exchange membrane are that: (1) transferring electric current; (2) allowing the hydrogen ions in the anode chamber to be migrated to the cathode chamber; and (3) preventing the precipitated flocs formed in the anode chamber through electro-coagulation from entering the cathode chamber.

Provided that an aluminum plate acts as the sacrificial electrode, the chemical principle of the present method is as follows:

the main reaction at anode: 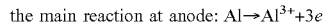 $Al \rightarrow Al^{3+} + 3e$ the main reaction at cathode:  $O_2 + 2H^+ + e \rightarrow H_2O_2$ After hydrolysis, polymerization and complexing reactions, $Al^{3+}$ dissolved out of the anode by electrochemical reaction may form a varies of polymerized aluminum hydrolyzed products and $Al(OH)_3$, who possess a relatively great amount of positive charges on their surface which can be used to perform adsorption and electric neutralization and precipitation capture.

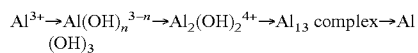 $Al^{3+} \rightarrow Al(OH)_n^{3-n} \rightarrow Al_2(OH)_2^{4+} \rightarrow Al_{13}\ complex \rightarrow Al(OH)_3$ This is a process of the catalytic polymerization at the cathode by immobilized-enzymatic electrode and the electro-coagulation at the anode with regard to the organic matters. By controlling the electrochemical parameters, the organic matters is subjected to a polymerization reaction catalyzed by hydrogen peroxide generated from a cathode reaction and the immobilized-enzymatic electrode, and thus dimers, trimers and multimers can be generated. Thus, molecular weight of the organic products after the reaction is increased, and the organic products enter the anode and then can be precipitated and removed through a coagulating/flocculating effect of compression of a double electric layer, adsorption and electric neutralization as well as precipitation capture or the like by different Al hydrolyzed species. Ultimately, the object of removing the organic matters synergistically through the enzymatic catalyzed polymerization at the cathode and the electro-coagulation at the anode is achieved.

The cathode in the invention is an oxygenating electrode with an immobilized enzyme. The immobilized enzyme on electrode according to the present invention can be achieved by chemical bonding, embedding, physical adsorption, etc.

The enzyme in the invention can be selected from horse radish peroxidase, lignin peroxidase, polyphenol oxidase, laccase, tyrosinase tyrosine, catechol oxidase, hemoglobinase or the like. A substrate electrode of the oxygenating electrode is graphite, active carbon, graphite felt, carbon felt, active carbon fiber, carbon nanotube or the like.

The electro-coagulation sacrificial anode in the invention can be selected from an aluminum plate, an iron plate, a ferro-aluminum plate or the like.

Another object of the present invention is to provide a reactor for removing organic matters by immobilized-enzymatic electrode coupled electro-coagulation comprising the units of a cathode, an anode, reference electrodes, an electrolytic tank, a water pump, a hydrogen ion exchange membrane, an aeration device and a direct current power supply or the like;

wherein the electrolytic tank is hermetically closed by rubber pads and fixation screws;

the cathode together with a reference electrode and the anode together with a reference electrode are disposed at two ends of the electrolytic tank respectively, and the hydrogen ion exchange membrane is disposed there between so as to form a cathode chamber and an anode chamber;

the cathode chamber is provided with the aeration device externally connected to an air compressor or an air pump so that a certain air flow enters the cathode zone to supply dissolved oxygen to a cathode solution;

the electrolytic tank and the water pump are connected with a pipeline so that a raw water is pumped into an inlet of the cathode chamber, and after an enzymatic polymerization reaction in the cathode chamber, discharged from an outlet of the cathode chamber, directed to an inlet of the anode chamber via a pipeline, and after an electro-coagulation reaction in the anode chamber, pumped out of an outlet of the anode chamber; and the direct current power supply is connected respectively to the cathode and the anode through metal conducting wires.

In the reactor for removing organic matters by immobilized-enzymatic electrode coupled electro-coagulation according to the invention, the inter-electrode distance between the cathode and the anode is range from 1 mm to 90 mm; the potential at the anode is ranged from 0.2 V to 2.0 V; the potential at the cathode is ranged from −0.2V to −1.2V; the current density is ranged from 0.001 A/cm$^2$ to 1 A/cm$^2$; the saturated calomel electrode is used as the reference electrode; the residence time is ranged from 5 min to 5 h; the addition amount of enzyme is ranged from 10 U/cm$^2$ to 1000 U/cm$^2$; and the air flow rate is ranged from 0.1 L/min to 100 L/min.

According to the present invention, both the immobilized-enzymatic electrode catalytic technology and the electro-coagulation technology are adopted in one reactor in order to highly and synergistically remove the organic matters in water. Accordingly, compared with the single immobilized-enzymatic electrode catalytic technology or the electro-coagulation technology, the present invention has the following advantages:

1) It has a good treating effect. On one hand, the method and reactor according to the present invention have a strong selectivity for the low-concentration toxic organic pollutants so as to further remove the enzymatic catalyzed polymerization products by electro-coagulation and thus has a better treating effect than the single electro-enzymatic catalysis technology. On the other hand, the method and reactor according to the present invention have a better effect for removing small-molecular hydrophilic organic matters than the single electro-coagulation technology since, through the enzymatic catalyzed polymerization, the molecular weight and structure of the small-molecular hydrophilic organic matters are changed so that the organic matters are easier to be precipitated and removed by electro-coagulation.

2) The addition amount of the enzyme is low and accordingly the cost is reduced.

3) Both the cathode and the anode are fully utilized so that the power energy is saved.

4) It has a wide variety of uses and is applicable not only to the deep treatment of organic matters with low concentration in water or wastewater but also to the remediation of the organic pollutants contaminated water e.g., in lake, water-storage reservoir, rivers, underground water, or the like.

5) It can be used to synergistically remove pollutants such as ammonia nitrogen and heavy metals in water and wastewater, in addition to the removals of the organic matters in water or wastewater

BRIEF DESCRIPTION OF THE DRAWINGS

The invention description below refers to the accompanying drawings, of which:

FIG. 1 is a schematic view of the reactor for removing organic matters by immobilized-enzymatic electrode coupled electro-coagulation according to the present invention, in which:

1. a direct current regulated power supply; 2. an amperemeter; 3. a voltmeter; 4. a cathode; 5. an anode; 6. a reference electrode; 7. a fixation screw; 8. an electrolytic tank; 9. an aeration device; 10. a rubber pad; 11. a hydrogen ion exchange membrane; 12. a water gauge; 13. an aerometer; 14. a water pump; 15. an air compressor or an air pump; 16. a water influent channel; 17. a water effluent channel.

DETAILED DESCRIPTION OF AN ILLUSTRATIVE EMBODIMENT

Referring to FIG. 1, a reactor for immobilized-enzymatic electrode coupled electro-coagulation comprises a DC (direct current) regulated power supply 1, an amperemeter 2, a voltmeter 3, a cathode 4, a anode 5, a reference electrode 6, an electrolytic tank 8, an aeration device 9, a hydrogen ion exchange membrane 11, a water gauge 12, an aerometer 13, a water pump 14, an air compressor or an air pump 15, a water influent channel 16, an, a water effluent channel 17 or the like.

According to the present invention, the electrolytic tank 8 is hermetically closed by rubber pads 10 and fixation screws 7. The cathode 4 together with a reference electrode 6 and the anode 5 together with a reference electrode 6 are disposed at two ends of the electrolytic tank 8 respectively, and the hydrogen ion exchange membrane 11 is disposed therebetween so as to form a cathode chamber and an anode chamber. The cathode chamber in the electrolytic tank also acts as a catalyzed polymerization reaction zone by immobilized-enzymatic electrode, and the anode chamber also acts as an electro-coagulation reaction zone. The cathode chamber is provided with the aeration device 9 externally connected with an air compressor or air pump 15.

According to the present invention, the electrolytic tank 8 and the peristaltic pump 14 is connected through a pipeline.

Raw water is pumped into an inlet of the cathode chamber from the water influent channel 16, and after an enzyme polymerization reaction in the cathode chamber, discharged from an outlet of the cathode chamber, directed to an inlet of the anode chamber via a pipeline, and after an electro-coagulation reaction in the anode chamber, pumped out of an outlet of the anode chamber to the water effluent channel 17. The DC power supply is connected respectively to the cathode and the anode through metal conducting wires.

In order to explain and illustrate the present invention in a better manner and to make the technical solution of the present invention easier to be understood, typical and non-restrictive examples of the present invention are presented as follows.

Example 1

The effective volumes of the cathode chamber and the anode chamber in the reactor were 40 mL A self-made immobilized-enzymatic electrode was used as the cathode, in which horse radish peroxidase was used as the enzyme with an addition amount of 10 U/cm$^2$; graphite was used as a substrate of the electrode; an air flow rate for the aeration device was 0.1 L/min; an aluminum plate was used as the anode; an inter-electrode distance between the cathode and the anode was 1 mm; a saturated calomel electrode was used as the reference electrode; and a cathode potential which was controlled by the DC regulated power supply was −0.2V. A bisphenol A solution (100 mg/L in concentration) was introduced into the reactor for immobilized-enzymatic electrode coupled electro-coagulation from the water inlet, in which the residence time was 5 min. As a result, a removal rate of the bisphenol A from the water was 90%. However, the removal rate of bisphenol A from the water was only 25% in the case that a graphite electrode without immobilized enzyme was used under the same conditions. That is, the synergistic effect of immobilized-enzymatic electrode and electro-coagulation can enhance the removal rate of the organic contaminants.

Example 2

The effective volumes of the cathode chamber and the anode chamber in the reactor were 4 L. A self-made immobilized-enzymatic electrode was used as the cathode, in which lignin peroxidase was used as the enzyme with an addition amount of 1000 U/cm$^2$; active carbon was used as a substrate of the electrode; an air flow rate for the aeration device was 100 L/min; an aluminum plate was used as the anode; an inter-electrode distance between the cathode and the anode was 90 mm; a saturated calomel electrode was used as the reference electrode; and a cathode potential which was controlled by the DC regulated power supply was −1.2V. A bisphenol A solution (100 mg/L in concentration) was introduced into the reactor for immobilized-enzymatic electrode coupled electro-coagulation from the water inlet, in which the residence time was 5 hours. As a result, a removal rate of the bisphenol A from the water was 99%. However, the removal rate of the bisphenol A from the water was only 35% in the case that an active carbon electrode without immobilized enzyme was used under the same conditions. That is, the synergistic effect of immobilized-enzymatic electrode and electro-coagulation can enhance the removal rate of the organic contaminants.

Example 3

The effective volumes of the cathode chamber and the anode chamber in the reactor were 40 mL. A self-made immobilized-enzymatic electrode was used as the cathode, in which polyphenol oxidase was used as the enzyme with an addition amount of 10 U/cm$^2$; a graphite felt was used as a substrate of the electrode; an air flow rate for the aeration device was 0.1 L/min; an iron plate was used as the anode; an inter-electrode distance between the cathode and the anode was 1 mm; a saturated calomel electrode was used as the reference electrode; and a cathode potential which was controlled by the DC regulated power supply was 0.2V. A humic acid solution (TOC of 100 mg/L) was introduced into the reactor for immobilized-enzymatic electrode coupled electro-coagulation from the water inlet, in which the residence time was 1 hour. As a result, a removal rate of the TOC was 80%. However, the removal rate of the TOC was only 15% in the case that a graphite felt electrode without immobilized enzyme was used under the same conditions. Additionally, the removal rate of the TOC was 50% in the case that only the immobilized-enzymatic electrode polymerization reaction but no electro-coagulation reaction was performed under the same conditions. That is, the synergistic effect of immobilized-enzymatic electrode and electro-coagulation can enhance the removal rate of the humic acid.

Example 4

The effective volumes of the cathode chamber and the anode chamber in the reactor were 4 L. A self-made immobilized-enzymatic electrode was used as the cathode, in which laccase was used as the enzyme with an addition amount of 1000 U/cm$^2$; carbon felt was used as a substrate of the electrode; an air flow rate for the aeration device was 100 L/min; an aluminum plate was used as the anode; an inter-electrode distance between the cathode and the anode was 90 mm; a saturated calomel electrode was used as the reference electrode; and a cathode potential which was controlled by the DC regulated power supply was 1.2V. A mixing solution of humic acid (TOC of 100 mg/L) and bisphenol A (100 mg/L in concentration) was introduced into the reactor for immobilized-enzymatic electrode coupled electro-coagulation from the water inlet, in which the residence time was 5 min. As a result, a removal rate of the bisphenol A from the water was 99% and a removal rate of the TOC was 80%. However, the removal rate of the bisphenol A from the water was only 25% and the removal rate of the TOC was only 10% in the case that a carbon felt electrode without immobilized enzyme was used under the same conditions. Additionally, the removal rate of the bisphenol A was only 85% and the removal rate of the TOC was only 30% in the case that only the immobilized-enzymatic electrode polymerization reaction but no electro-coagulation reaction is performed under the same conditions. That is, the synergistic effect of immobilized-enzymatic electrode and electro-coagulation can enhance the removal rate of the humic acid and that of the bisphenol A.

Example 5

The effective volumes of the cathode chamber and the anode chamber in the reactor were 40 mL. A self-made immobilized-enzymatic electrode was used as the cathode, in which tyrosinase tyrosine was used as the enzyme with an addition amount of 10 U/cm$^2$; active carbon fiber was used as a substrate of the electrode; an air flow rate for the aeration device was 1 L/min; a ferro-aluminum plate was used as the anode; an inter-electrode distance between the cathode and the anode was 10 mm; a saturated calomel electrode was used as the reference electrode; and a current density which was controlled by the DC regulated power supply was 0.001 A/cm$^2$. A mixing solution of humic acid (TOC of 100 mg/L) and bisphenol A (100 mg/L in concentration) was introduced into the reactor for immobilized-enzymatic electrode coupled electro-coagulation from the water inlet, in which the residence time was 5 hours. As a result, a removal rate of the bisphenol A from the water was 95% and a removal rate of the TOC was 70%. However, the removal rate of the bisphenol A from the water was only 23% and the removal rate of the TOC was only 12% in the case that active carbon fiber electrode without immobilized enzyme was used under the same conditions. Additionally, the removal rate of the bisphenol A was only 80% and the removal rate of the TOC was only 26% in the case that only the immobilized-enzymatic electrode polymerization reaction but no electro-coagulation reaction is performed under the same conditions. That is, the synergistic effect of immobilized-enzymatic electrode and electro-coagulation can enhance the removal rate of the humic acid and that of the bisphenol A.

Example 6

The effective volumes of the cathode chamber and the anode chamber in the reactor were 4 L. A self-made immobilized-enzymatic electrode was used as the cathode, in which catechol oxidase was used as the enzyme with an addition amount of 1000 U/cm$^2$; active carbon fiber was used as a substrate of the electrode; an air flow rate for the aeration device was 100 L/min; a ferro-aluminum plate was used as the anode; an inter-electrode distance between the cathode and the anode was 90 mm; a saturated calomel electrode was used as the reference electrode; and a current density which was controlled by the DC regulated power supply was 1 A/cm$^2$. A mixing solution of humic acid (TOC of 100 mg/L) and bisphenol A (100 mg/L in concentration) was introduced into the reactor for immobilized-enzymatic electrode coupled electro-coagulation from the water inlet, in which the residence time was 5 min. As a result, a removal rate of the bisphenol A from the water was 90% and a removal rate of the TOC was 60%. However, the removal rate of the bisphenol A from the water was only 15% and the removal rate of the TOC was only 10% in the case that active carbon fiber electrode without immobilized enzyme was used under the same conditions. Additionally, the removal rate of the bisphenol A was only 75% and the removal rate of the TOC was only 20% in the case that only the immobilized-enzymatic electrode polymerization reaction but no electro-coagulation reaction is performed under the same conditions. That is, the synergistic effect of immobilized-enzymatic electrode and electro-coagulation can enhance the removal rate of the humic acid and that of the bisphenol A.

Example 7

The effective volumes of the cathode chamber and the anode chamber in the reactor were 40 mL. A self-made immobilized-enzymatic electrode was used as the cathode, in which hemoglobinase was used as the enzyme with an addition amount of 100 U/cm$^2$; carbon nanotubes were used as a substrate of the electrode; an air flow rate for the aeration device was s 0.1 L/min; an aluminum plate was used as the anode; an inter-electrode distance between the cathode and the anode was 5 mm; a saturated calomel electrode was used as the reference electrode; and a current density which was controlled by the DC regulated power supply was 0.001 A/cm². An effluent from a wastewater (COD of 150 mg/L) was into the reactor for immobilized-enzymatic electrode coupled electro-coagulation from the water inlet, in which the residence time was 5 hours. As a result, a removal rate of the COD was 60%. However, the removal rate of the COD was only 30% in the case that a carbon nanotube electrode without immobilized enzyme was used under the same conditions. Additionally, the removal rate of the COD was 40% in the case that only the immobilized-enzymatic electrode polymerization reaction but no electro-coagulation reaction was performed under the same conditions. That is, the synergistic effect of immobilized-enzymatic electrode and electro-coagulation can enhance the removal rate of the COD in the wastewater.

It would be appreciated by those skilled in the art that various changes or modifications may be made in these embodiments of the present invention without departing from the principles and spirit of the enclosed claims. Therefore, the scope of the technical solution to be protected is not restricted by any specified teachings recited in the specification.

The above examples are listed for illustrating the specific methods of the invention, however, the present invention is not limited to the above specific methods, and it is not means that the invention must be carried out depending on the above specific methods. It is clear for those skilled in the art that any modifications to the invention, the replacement of the respective raw materials for the product of the invention, as well as the addition of the assisting components and the specific manners, all fall into the scope to be protected in the invention.

The invention claimed is:

1. A method for removing organic matters by immobilized-enzymatic electrode coupled electro-coagulation, comprising the steps of:
   1) coupling electro-coagulation and an immobilized-enzymatic electrode in a single electrochemical system in which the cathode is an oxygenating electrode with an immobilized enzyme and the anode is an electro-coagulation sacrificial electrode;
   2) separating the cathode and the anode in an electrolytic tank by a hydrogen ion exchange membrane to form a cathode chamber and an anode chamber;
   3) introducing a raw water into the cathode chamber; subjecting the organic matters in the raw water to a polymerization reaction catalyzed by hydrogen peroxide generated from a cathode reaction and the immobilized-enzymatic electrode, under a certain cathode potential or a certain current density with a saturated calomel electrode as a reference electrode; and pumping the reacted raw water into the anode chamber after a certain residence time; and
   4) generating fresh hydrolysis products by dissolving the metal anode in the anode chamber, under a certain anode potential or a certain current density with a saturated calomel electrode as a reference electrode; precipitating and removing the organic polymerized products, which are produced from an enzymatic catalysis reaction in the cathode chamber, by metal hydrolysis products through a coagulation/flocculation effect of compression of a double electric layer, adsorption and electric neutralization as well as precipitation capture; and discharging the treated water from the anode chamber after an electro-coagulation reaction so as to achieve the object of removing the organic matters synergistically through the enzymatic catalyzed polymerization at the cathode and the electro-coagulation at the anode.

2. The method for removing organic matters by immobilized-enzymatic electrode coupled electro-coagulation according to claim 1, wherein the immobilized enzyme on the cathode is horse radish peroxidase, lignin peroxidase, polyphenol oxidase, laccase, tyrosinase tyrosine, catechol oxidase, or hemoglobinase; and an addition amount of the enzyme is 10 U/cm² to 1000 U/cm².

3. The method for removing organic matters by immobilized-enzymatic electrode coupled electro-coagulation according to claim 1, wherein a substrate for the cathode is graphite, active carbon, graphite felt, carbon felt, active carbon fiber, or carbon nanotube.

4. The method for removing organic matters by immobilized-enzymatic electrode coupled electro-coagulation according to claim 1, wherein the anode is an aluminum plate, an iron plate, or a ferro-aluminum plate.

5. A reactor for removing organic matters by immobilized-enzymatic electrode coupled electro-coagulation comprising a cathode, an anode, reference electrodes, an electrolytic tank, a water pump, a hydrogen ion exchange membrane, an aeration device and a direct current power supply;
   wherein the electrolytic tank is hermetically closed by rubber pads and fixation screws;
   the cathode together with a reference electrode and the anode together with a reference electrode are disposed at two ends of the electrolytic tank respectively, and the hydrogen ion exchange membrane is disposed therebetween so as to form a cathode chamber and an anode chamber;
   the cathode chamber is provided with the aeration device externally connected to an air compressor or an air pump so that a certain air flow enters the cathode zone to supply dissolved oxygen to a cathode solution;
   the electrolytic tank and the water pump are connected with a pipeline so that a raw water is pumped into an inlet of the cathode chamber, and after an enzymatic polymerization reaction in the cathode chamber, discharged from an outlet of the cathode chamber, directed to an inlet of the anode chamber via a pipeline, and after an electro-coagulation reaction in the anode chamber, pumped out of an outlet of the anode chamber; and
   the direct current power supply is connected respectively to the cathode and the anode through metal conducting wires.

6. The reactor for removing organic matters by immobilized-enzymatic electrode coupled electro-coagulation according to claim 5, wherein the immobilized enzyme on the cathode is horse radish peroxidase, lignin peroxidase, polyphenol oxidase, laccase, tyrosinase tyrosine, catechol oxidase, or hemoglobinase; and an addition amount of the enzyme is 10 U/cm² to 1000 U/cm².

7. The reactor for removing organic matters by immobilized-enzymatic electrode coupled electro-coagulation according to claim 5, wherein a substrate for the cathode is graphite, active carbon, graphite felt, carbon felt, active carbon fiber, or carbon nanotube.

8. The reactor for removing organic matters by immobilized-enzymatic electrode coupled electro-coagulation according to claim 5, wherein the anode is an aluminum plate, an iron plate, or a ferro-aluminum plate.

9. The reactor for removing organic matters by immobilized-enzymatic electrode coupled electro-coagulation according to claim 5, wherein the distance between the cathode and the anode is ranged from 1 mm to 90 mm.

10. The reactor for removing organic matters by immobilized-enzymatic electrode coupled electro-coagulation according to claim 5, wherein a potential at the anode is ranged from 0.2 V to 2.0 V and a potential at the cathode is ranged from −1.2 V to −0.2 V.

11. The reactor for removing organic matters by immobilized-enzymatic electrode coupled electro-coagulation according to claim 5, wherein the residence time is ranged from 5 min to 5 h.

12. The reactor for removing organic matters by immobilized-enzymatic electrode coupled electro-coagulation according to claim 5, wherein the air flow rate is ranged from 0.1 L/min to 100 L/min.

\* \* \* \* \*